Sept. 25, 1951 G. H. PALM 2,568,929
HOSE REEL
Filed Oct. 8, 1947 7 Sheets-Sheet 1

Inventor:
George H. Palm
By Hink, Horton, Ahlary, Hausmann & Wuppe
Attorneys.

Sept. 25, 1951      G. H. PALM      2,568,929
HOSE REEL
Filed Oct. 8, 1947      7 Sheets-Sheet 2
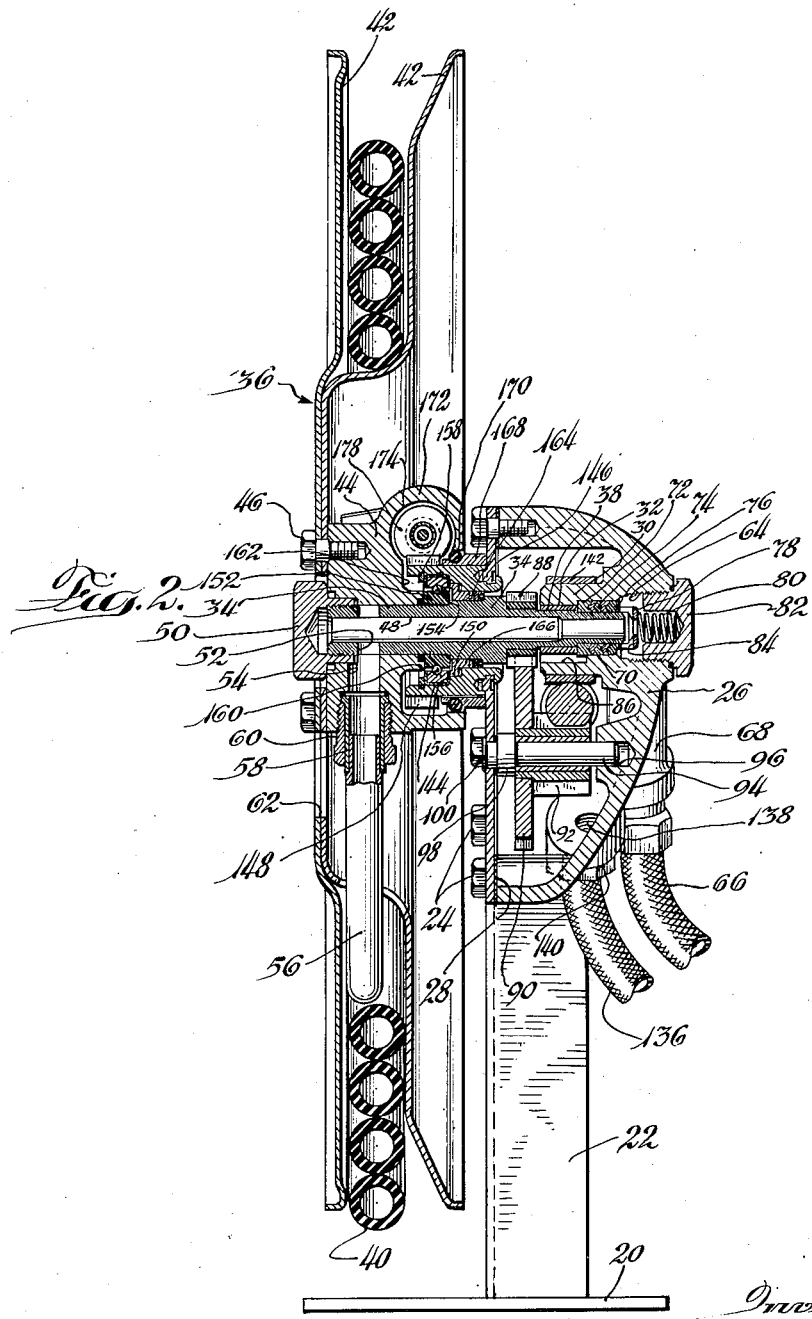

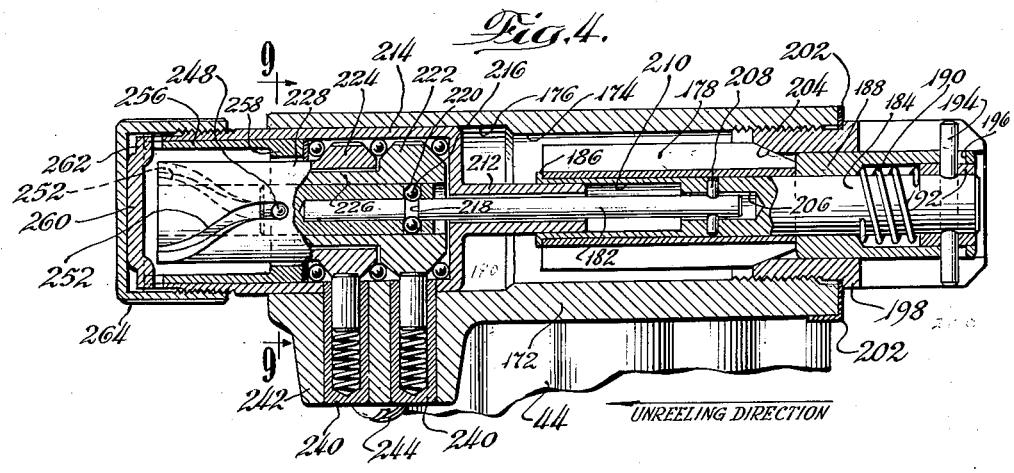
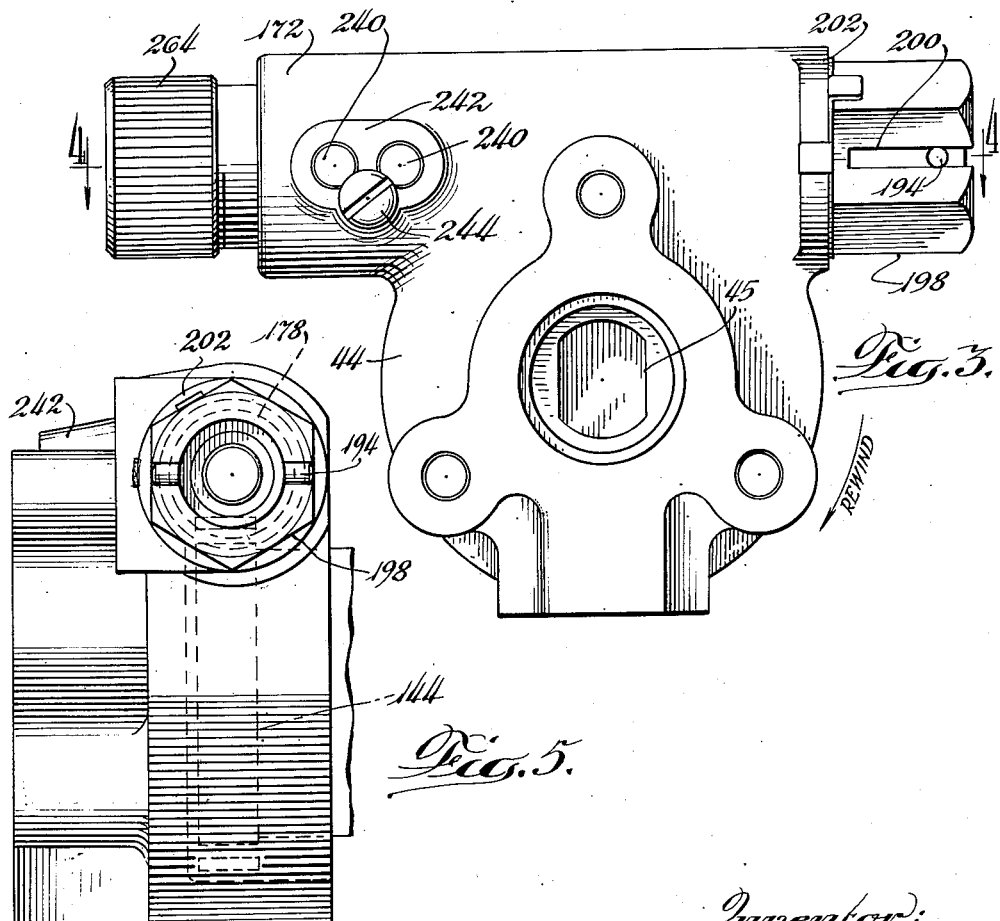

Sept. 25, 1951 G. H. PALM 2,568,929
HOSE REEL
Filed Oct. 8, 1947 7 Sheets-Sheet 4
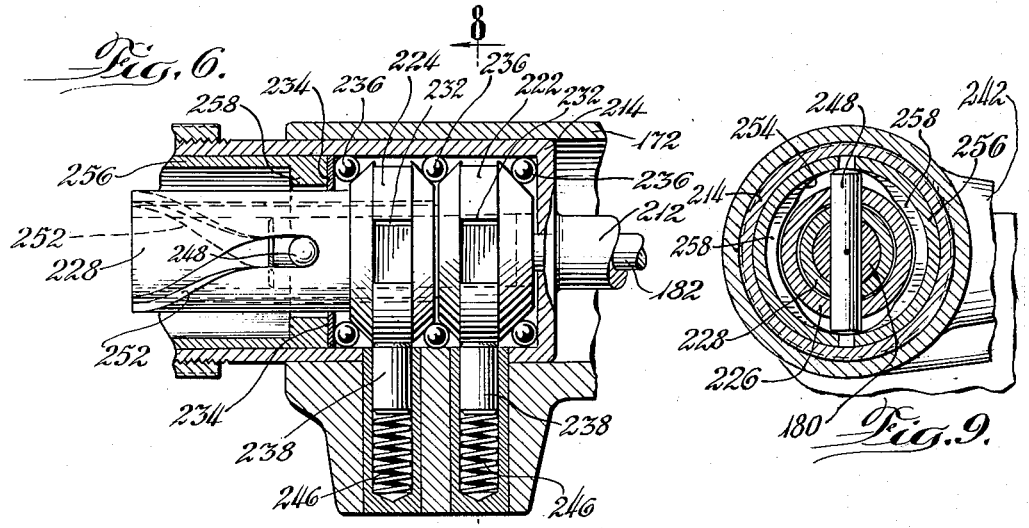
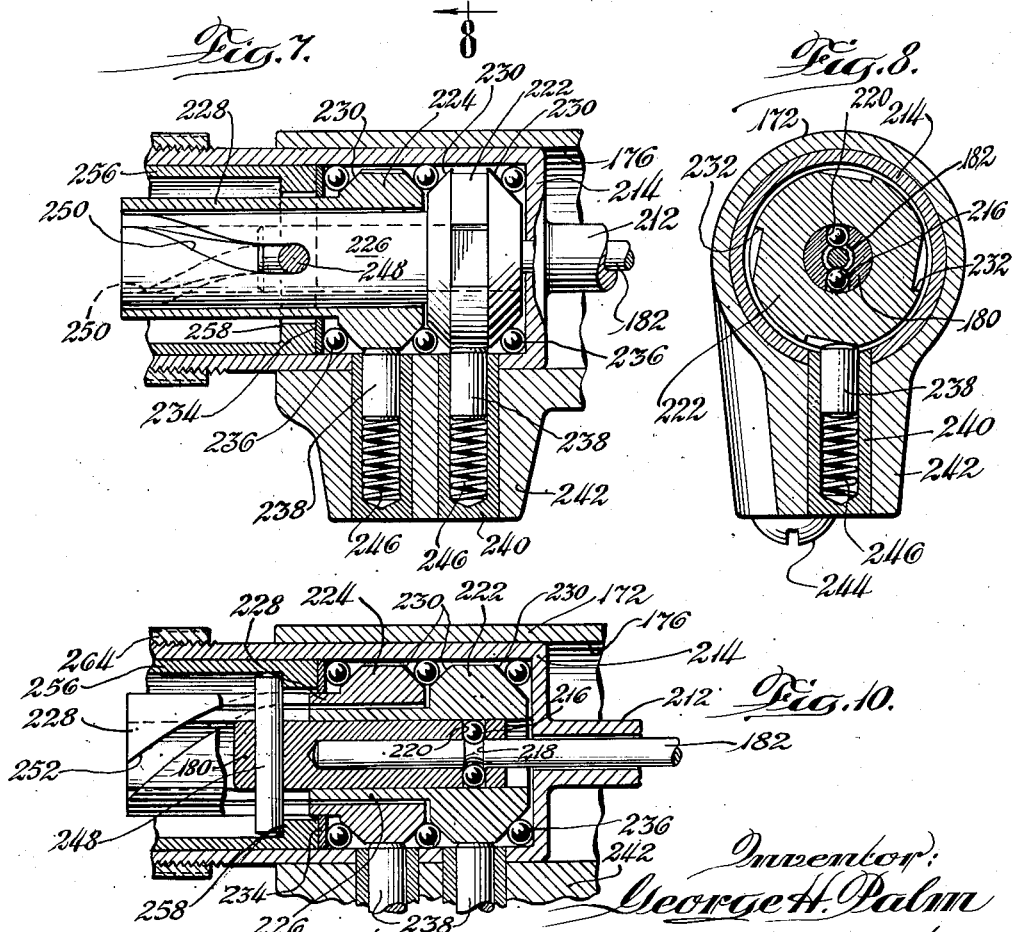

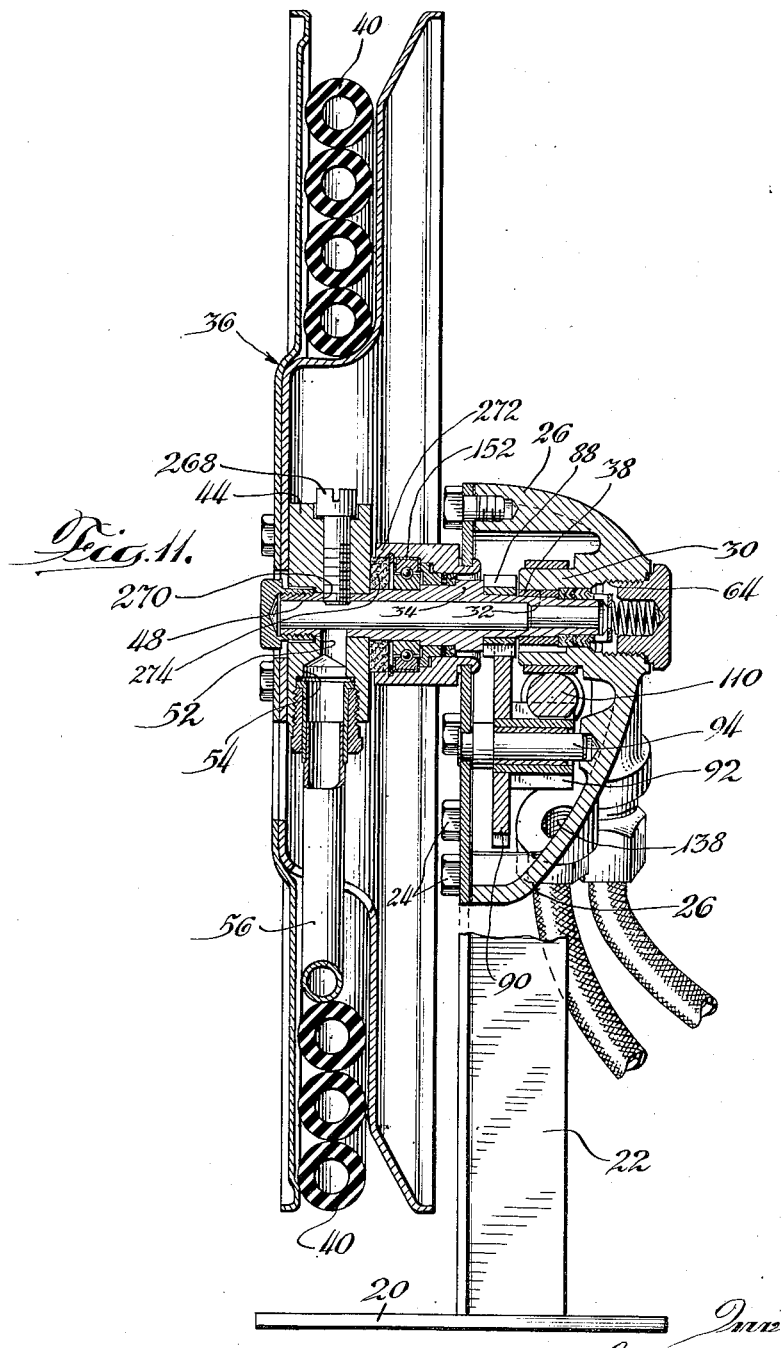

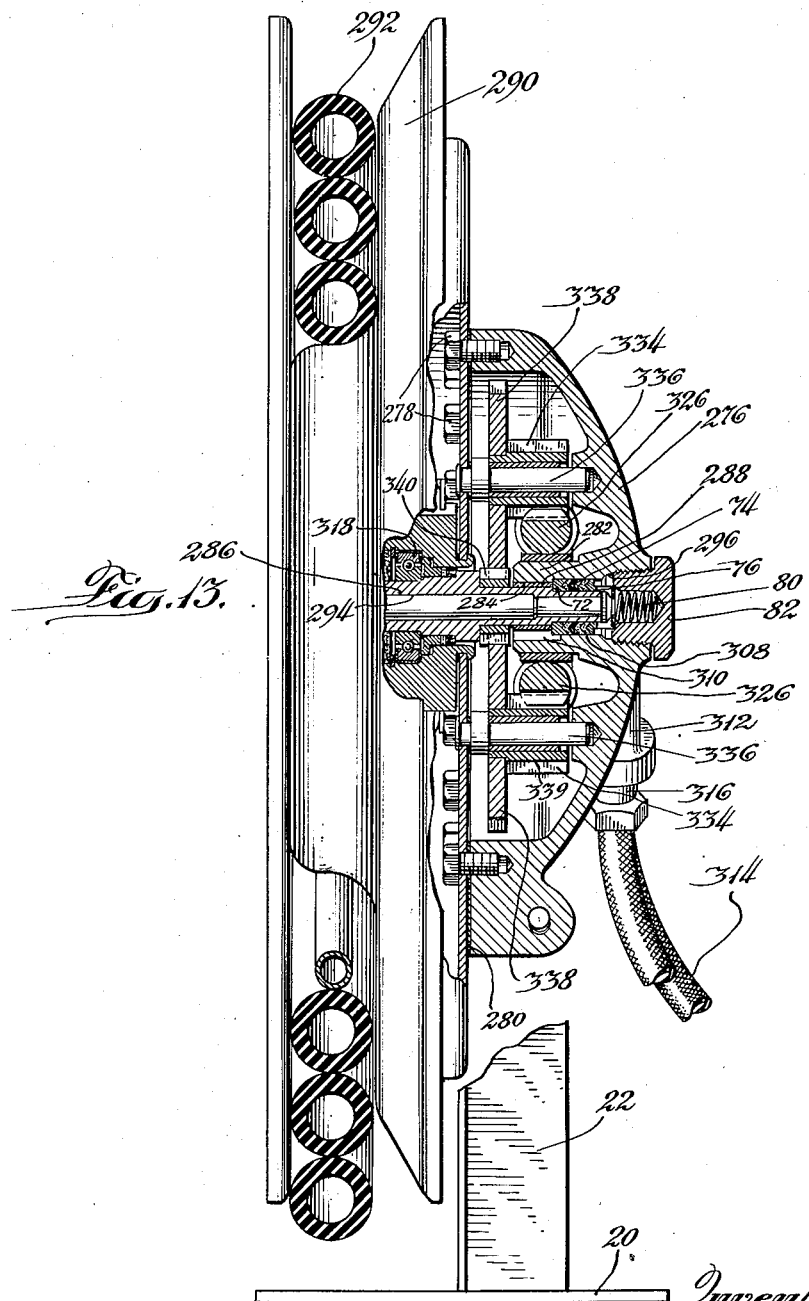

Patented Sept. 25, 1951

2,568,929

UNITED STATES PATENT OFFICE 2,568,929

HOSE REEL

George H. Palm, Chicago, Ill., assignor to Stewart-Warner Corporation, Chicago, Ill., a corporation of Virginia Application October 8, 1947, Serial No. 778,697

23 Claims. (Cl. 299—78)

The present invention relates to a power operated reels of the type commonly used for storing hose and more particularly to improved power means for actuating the reel in a rewinding direction and to improved means for restraining rotatation of the reel in a rewinding direction which may be controlled by manipulating the hose.

A primary object of the invention is the provision in a reeling apparatus of a new and improved fluid actuated power means for driving the reel in a rewinding direction which may be actuated by the liquid or gas which is being dispensed through the hose or by means of a fluid other than that being dispensed and which may be readily adapted for actuation in either way.

Another primary object of the invention is to provide a hose reel apparatus of the foregoing character having new and improved means controlled by manipulation of the hose for restraining rotation of the reel in a rewinding direction after a desired length of hose has been unwound from the reel so that the unwound hose does not have to be held manually against rewinding while it is in use.

A further object of the invention is the provision of a new and improved reel locking means for hose reel apparatus of the foregoing character so constructed that strain thereon is reduced to a minimum and in which compensation is automatically made for ordinary wear.

A still further object of the invention is the provision of a hose reel apparatus having improved means for restraining rotation of the reel in a rewinding direction which is automatically rendered ineffective upon initiation of rotation of the reel in a rewinding direction and is rendered effective to restrain the reel against rewinding on alternate successive interruptions in unwinding movement so that rewinding of the hose can be readily controlled by manipulating the hose.

Another object of the invention is the provision of a hose reel apparatus having improved power means for driving the reel in a direction to rewind the hose thereon and improved means for restraining rotation of the reel in a rewinding direction, each of which means may be used independently of the other.

A further object of the invention is the provision of a hose reel apparatus which is simple and inexpensive in construction, easy to operate, and in which the parts may be compactly arranged so that a minimum of space is occupied by the reel.

These and other objects, advantages and capabilities of the invention will become apparent from the following description wherein reference is had to the accompanying drawings, in which:

Fig. 2 is a sectional view on a slightly enlarged scale, taken on the line 2—2 of Fig. 1;

Fig. 3 is a side elevational view on an enlarged scale of the reel hub and mechanism for restraining rotation of the reel in a rewinding direction;

Fig. 4 is a fragmentary horizontal cross-sectional view of the reel restraining mechanism in restraining position taken on the line 4—4 of Fig. 3;

Fig. 5 is an elevational view of the right-hand end of the reel restraining mechanism shown in Fig. 3;

Fig. 6 is a fragmentary view partly in horizontal section showing the ratcheting cam mechanism which controls the operation of the reel restraining mechanism;

Fig. 7 is a view similar to Fig. 6 but showing one of the ratchets in cross-section;

Fig. 8 is a vertical sectional view taken in the direction of the arrows on the line 8—8 of Fig. 6;

Fig. 9 is a vertical sectional view taken in the direction of the arrows on the line 9—9 of Fig. 4;

Fig. 10 is a horizontal sectional view similar to Fig. 6 but with the ratcheting cam mechanism displaced 90° from the position shown in Fig. 6;

Fig. 11 is a transverse sectional view on the order of Fig. 2 showing a second embodiment of the invention;

Fig. 13 is a cross-sectional view taken in the direction of the arrows on the line 13—13 of Fig. 12.

Figure 1:
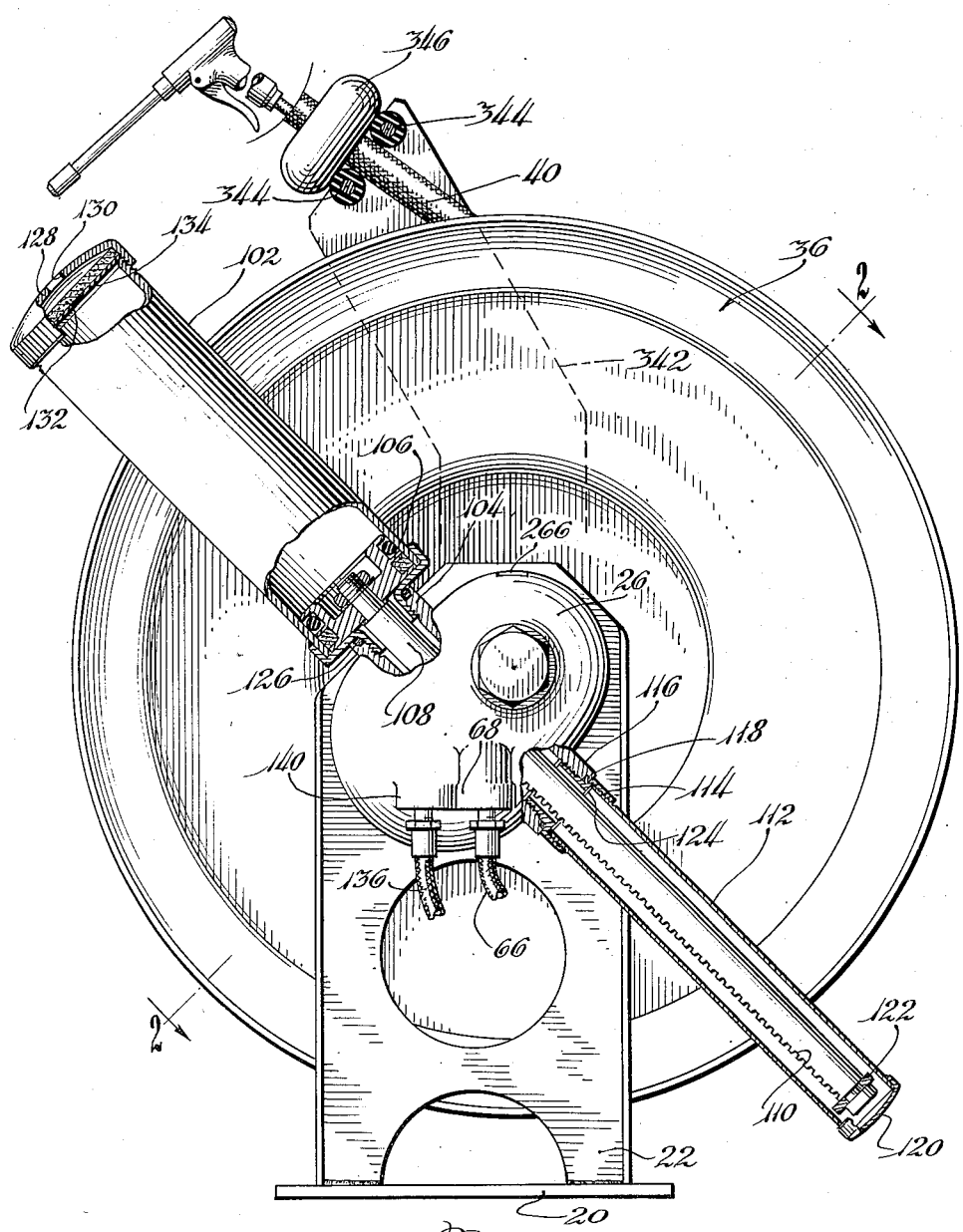
Fig. 1 is a side elevational view partly in section of one embodiment of the improved hose reel apparatus of the present invention.

The hose reel of the present invention is supported upon a base including a foot 20 and an upright standard 22 which may be in the form of a channel iron, as shown in Figs. 1 and 2. Fixedly secured to this standard as by cap screws 24 is a hollow casting 26 which forms both a housing for the reel driving gears and a pressure chamber for receiving the motivating fluid. A gasket 28 is interposed between the upright 22 and the end wall of the casting 26 to provide a fluidtight seal at this union.

An inwardly projecting generally cylindrical boss 30 on the interior of the casting has a bore 32 extending from its inner end forming a journal for supporting one end of a hollow rotatable reel shaft 34 to which a reel or spool 36 is fixedly secured, there being a bushing 38 in the bore 32 in which the reel shaft rotates.

The reel 36 for receiving a length of hose 40 is formed from a pair of circular sheet metal plates 42 dished, as shown, and secured to a hub 44 by means of cap screws 46 threaded into the hub. The reel shaft 34 has an axial passageway 48 extending therethrough and it is flattened on opposite sides along the end which receives the hub 44 for snugly engaging in a complementary aperture formed in the hub, as indicated at 45 in Fig. 3, so that the hub and shaft are non-rotatable with respect to each other. A cap 50 threaded on the end of shaft 34 into abutting engagement with the hub holds the spool assembly on the shaft and also forms a closure for the end of the axial passageway 48 in the shaft.

The axial passageway 48 communicates with the hose 40 through aligned radially extending bores 52 and 54 in the shaft and hub, respectively, and a V-shaped outlet fitting 56 secured at one end in the bore 54 in the hub and having the hose 40 attached to its other end. A fluidtight seal between the end of the fitting 56 and the hub is secured by means of a sleeve 58 sweated on the end of the fitting and having a terminal flange engaged by the inner end of a tubular coupling member 60 surrounding the sleeve and threaded into an enlarged portion of the bore 54 in the hub. Suitable packing rings may be interposed between the flanged end of sleeve 58 and the shoulder formed in the bore 54. In order to facilitate coupling or uncoupling of this fitting 56, an aperture 62 is provided in the plates 42 through which access may be had to the head on coupling member 60 so that it can be loosened or tightened.

At the end opposite the hub, the axial passageway 48 in the reel shaft communicates with an enlarged threaded counterbore 64 in the casting 26 which forms an inlet chamber for the fluid to be dispensed. The fluid flows from a source of fluid under pressure, which may be of known construction, through a conduit 66 secured in an inlet opening in an external boss 68 on the casting 26 communicating with the inlet chamber 64.

A fluidtight seal around this end of the reel shaft, between the hollow interior of the casting 26 and the inlet chamber 64, is provided by sealing means disposed in an intermediate bore or recess 70 axially aligned with the bore 32 so as to define an annular space or recess around the end of the reel shaft. This sealing means includes an inner forming ring 72, a plurality of separate packing rings 74 of suitable material, and an outer forming ring 76, all disposed about the end of reel shaft 34 and within the intermediate recess 70. The outer forming ring 76 has an extension 78 which projects beyond the end of reel shaft 34 to form a seat for one end of a tension spring 80 projecting from a bore in a cap 82 threaded into the end of the inlet chamber 64 so that the spring 80 pressing on the forming ring 76 holds the packing rings 74 in sealing relation with the shaft while the cap forms a closure for the inlet chamber 64. The extension 78 is provided with vertical and axial bores 84 through which communication is established between the axial passageway 48 in the reel shaft and the inlet chamber 64.

While this construction forms a fluidtight seal around the rotatable shaft 34 between the inlet chamber 64 and the interior of the casting 26, it also facilitates removal of the sealing means when that is desired. All that need be done is to unscrew cap 82 and remove the forming and packing rings by sliding the same off the end of shaft 34. Communication then will be established between the inlet chamber 64 and the interior of the casting through the recess 70 and a drilled passageway 86 in the boss 30, as shown in Fig. 2. The conditions under which it is desirable to establish such communication will be described hereinafter.

The means for rotating the reel shaft 34 includes a pinion 88 fixed on a portion of the shaft within the casting 26 and a driving gear 90 meshing therewith and fixedly associated with a driven pinion 92 which is rotatable upon a shaft 94, supported at one end in a bore 96 in an internal boss in the casting 26, and at the opposite end in an aperture in the upright 22 of the base. An enlarged portion 98 of the shaft 94 forms a spacer between the side of the upright 22 and the gear 90 for properly positioning gear 90 with respect to the reel shaft pinion 88. The shaft 94 may be held in position by peening, as indicated at 100, and a gasket should be interposed between the enlarged portion 98 of the shaft and the upright to form a fluidtight seal around the shaft.

In Fig. 1 power means for driving the pinion 92 is shown comprising a power cylinder 102 threaded into a boss 104 on the casting 26, and having a piston 106 reciprocable therein with a piston rod 108 attached thereto of sufficient length to project through and extend outwardly from the casting 26. The piston rod has rack teeth formed on one of its edges that engage in the teeth on pinion 92 so that this extending end of the piston rod forms a rack gear 110 for driving the pinion, and this rack gear is enclosed by a tubular housing 112 extending outwardly from the casting in axial alignment with the cylinder 102. A coupling member 114, to which the housing is secured, is threaded into a boss 116 on the casting 26 and the union is made fluidtight by a packing ring 118 while the outer end of the housing may be closed by a removable cap 120. An abutment or stop 122 is provided adjacent the outer end of the rack gear adapted to engage upon an internal shoulder 124 in the coupling member 114 to limit upward movement of the rack gear 110. By removing the cap 120, access may be had to the interior of the housing 112 for adjusting the abutment 122.

The cylinder 102 is likewise secured to the casting by a fluidtight union provided by a packing ring 126, while the outer end of the cylinder is closed by a removable cap 128 which has an aperture 130 therein for the flow of air into or out of the space in this cylinder above the piston, so that the piston operates free of external pressures. A filter consisting of a felt pad 132 supported upon an apertured plate 134 is preferably provided in the upper end of the cylinder to prevent foreign materials from entering the cylinder.

The driving piston in a hose reel of this type preferably is actuated by compressed air where the hose reel is used for storing lubricant hose, and air for this purpose may be supplied from a source of air under pressure of known construction through a conduit 136 threaded into an inlet opening 138 in an external boss 140 on the casting 26. This inlet communicates with the interior of the casting 26 and the space therein surrounding the operating mechanism. This space, the space in the interior of the tubular housing 112, and the space in cylinder 102 below the piston 106 forms intercommunicating air chambers so that air under pressure entering the casting constantly urges the piston 106 toward the upper end of the cylinder 102 carrying the rack gear 110 to the upper limit of its stroke at which position the hose is fully rewound on the reel. A sleeve bearing 142 (Fig. 2) rotatable upon the boss 30 in the casting engages the side of the rack gear 110 opposite the rack teeth to form a nonfriction means for guiding the rack gear and for holding its teeth in engagement with the teeth on pinion 92. The gearing in the casting is so arranged that upward movement of the piston rod drives the reel shaft 34 and reel attached thereto in a rewinding direction which would be in a clockwise direction, as viewed in Fig. 1, and the ratio of the pinions 88 and 92 and gear 90 is such that the hose will be completely wound on the spool 36 when the piston 106 is at the top of the cylinder so that the power means need be operated through only a relatively short distance, thus making possible a compact structure.

In the use of hose reels it has been found convenient to provide some form of locking or restraining means for the reel to prevent rewinding of hose after it has been unreeled to a desired length so that the operator need not apply a constant force on the hose to keep it unreeled. Futhermore this means should be operable to lock the hose irrespective of what portion of the hose has been unreeled; and in addition the reel should be capable of actuation in a rewinding direction irrespective of what portion of the total length of hose has been withdrawn.

One of the features of the present invention is the novel reel restraining means which have been incorporated in the apparatus for achieving operation of the reel in the foregoing manner. Referring to Fig. 2, it will be seen that a hollow hub gear 144 is fixed to the upright 22 by staking one end of the same to an aperture in the upright, and the gear is further locked against rotation by means of a plurality of shear lugs 146 formed on the upright 22 and projecting into correspondingly spaced apertures on the end of the hub gear. This gear has teeth indicated at 148 and a stepped bore 150 in which a nonfriction ball bearing 152 for the reel shaft 34 is seated. This bearing is of conventional construction and is held in place against a shoulder 154 on the shaft 34, and a shoulder 156 formed at the end of bore 150 by means of a C-spring 158 engaged in a groove in the bore 150 and a bead 160 formed on the end wall of a cavity 162 in one end of the hub 44.

The bearing 152 and the manner in which it it mounted adapt the same for functioning as a thrust bearing to minimize the effect of the axial thrust toward the left, as seen in Fig. 2, resulting from the pressure of the lubicant or other fluid being dispensed reacting between the fixed chamber 64 and the oppositely located end of the axial passageway 48 in the shaft 34.

A seal is effected between the shaft 34 and the pressure chamber formed in casting 26 by means of sealing rings 164 of suitable material encompassing the intermediate portion of the shaft 34 and urged into engagement with a shoulder on the shaft by means of an annular spacer 166 engaged at one end against the packing rings, and at the other end against the outer race of the bearing 152.

Normally the cavity 162 within the hub 44 surrounding the hub gear 144 is filled with a heavy lubricant, and this is sealed against escape around the ends of the hub by means of a sleeve 168 on the hub gear and a sealing ring 170 of neoprene or similar material between the sleeve and the hub.

The hub 44 is provided with an integral enlarged cylindrical boss or formation 172, best seen in Figs. 2 and 3. This part of the hub has aligned intersecting bores 174 and 176, as shown in Fig. 4, for housing the mechanism for restraining movement of the reel in a rewinding direction so that rewinding of hose upon the reel can be controlled by manipulating the hose to actuate the restraining mechanism to restraining position or to release the same from restraining position. This mechanism, as indicated in Figs. 2, 3 and 5, is actuated by a worm 178 housed in bore 174 which engages and is driven by the fixed hub gear 144 as the reel hub rotates about this gear carrying the worm with it.

Referring to Fig. 4, it will be seen that this worm is positioned on a shaft assembly which includes a ratchet shaft 180, a swivel shaft 182 and a worm shaft 184 between a flange 186 on one end of the worm shaft and a bushing 188 on the opposite end of this shaft. Rotation of the worm on the worm shaft 184 is restrained to a limited extent due to the pressure exerted thereon by the end of the bushing 188 which is urged into engagement with the worm by a tension spring 190 upon the shaft housed in a counterbore in the bushing and abutting at its outer end against a retaining ring 192 in the counterbore locked on the outer end of the shaft by a diametrically extending pin 194. Limited axial play between the worm shaft and bushing is afforded by the slots 196 in the bushing through which the pin passes, and this also provides an automatic takeup for wear which may occur between the worm and bushing. The restraint afforded by the spring 190 is sufficient to cause the entire shaft assembly to be moved to the left, as shown in Fig. 4, upon initial rotation of the reel in an unwinding direction; and to the right upon initial rotation of the reel in a rewinding direction.

Slidable support for the outer end of the shaft assembly is provided by a hollow clutch nut 198 threaded into the bore 174 and having axially extending slots 200 into which the ends of the pin 194 project, as shown in Figs. 3 and 4, so that the shaft assembly is locked against rotation and is limited in its movement to the left by engagement of the pin with the ends of the slots 200. The nut 198 may be locked in position by a locking plate 202 having a finger bent against one side of the hub 44, and a second finger bent against one of the flat sides of the nut.

The inner end of the clutch nut 198 is finished with a tapered surface 204 inclined at an angle corresponding to the taper on the front end of the worm so that the worm will snugly engage this surface when the shaft assembly moves to the extreme right, as shown in Fig. 4, for a purpose which will be described in detail hereinafter.

Referring again to Fig. 4, it will be seen that the worm shaft 184 is provided with an axial bore 206 for receiving one end of the swivel shaft 182 which is locked thereto by a pin 208 extending diametrically through the parts, and a counterbore 210 for slidably receiving a hollow stem 212 projecting from a cylindrical ratchet housing 214 seated in the bore 176. Thus, axial movement of the shaft assembly is guided by engagement of the bushing 188 in the hollow clutch nut 198, and engagement of the counterbore 210 in the worm shaft over the stem 212. When the worm shaft moves axially it of course correspondingly moves the swivel shaft 182 which extends through the hollow stem and into the ratchet housing 214. This movement actuates a stop pin and ratcheting cam mechanism which will now be described for controlling movement of the worm toward engagement with the clutch nut.

Within the ratchet housing this swivel shaft 182 extends into a bore in the short ratchet shaft 180, and these two shafts are connected to each other by means of two balls 216 seated in a circumferential groove 218 in the swivel shaft 182 and projecting into pockets 220 formed in the wall of the ratchet shaft so that the latter moves axially with the swivel shaft and at the same time may rotate relative thereto.

Also housed within the ratchet housing is a pair of rotatable ratcheting cams 222 and 224. Cam 222, which will be called the inner cam to eliminate confusion, while cam 224 will be called the outer, has a sleeve 226 extending therefrom within which the ratchet shaft 180 moves and upon which the outer cam 224 is rotatably received. This outer cam also has a sleeve 228 integral therewith and rotatable upon the sleeve 226. The peripheral edges of the ratchet heads on these cams are beveled as indicated at 230 and the heads are provided with a plurality of teeth indicated at 232 in Fig. 8 where four teeth are shown, these teeth being similarly arranged on the two heads to permit clockwise rotation thereof, as seen in Fig. 8. Friction between the two cams and between the cams and the non-rotatable ratchet housing, and a retaining washer 234 which holds the cams in position in the inner end of the ratchet housing, is reduced by means of a series of balls 236 in the spaces defined by the beveled edges of the ratchet heads.

Each of the cams is locked against counter-clockwise rotation as seen in Fig. 8, by a pawl 238 engageable with the teeth 232, and slidable in tubular pawl guides 240 housed in parallel bores in a boss 242 on the tubular formation, as shown in Figs. 3, 4 and 6, and extending into apertures in the ratchet housing 214 to lock the same in position. These pawl guides are held in position by a button head screw 244 threaded into the boss 242 so that its head overlaps a portion of the end of each guide, as seen in Fig. 3. Springs 246 in the guides urge the pawls into engagement with the ratchets.

Axial movement of the shaft assembled is translated to combined axial and rotary movement of the ratchet shaft and rotary movement of one or the other of the cams in a clockwise direction, as seen in Fig. 8, by the cooperative action of a diametrically extending stop member or pin 248 in the end of ratchet shaft 180, and a pair of helical cam slots in the sleeves of the ratchets, as seen in Figs. 4, 6 and 7. The sleeve 226 on the inner ratchet 222 is provided with diametrically opposite right-hand helical cam slots 250 a fraction of a turn in length while the sleeve 228 on the outer ratchet 224 is provided with similar cam slots 252 but running in a left-hand direction, as most clearly shown in Figs. 6 and 7. The opposite ends of the stop pin 248 engage in these cam slots so that the cams are interconnected thereby and cooperate to rotate the stop pin in a manner and for a purpose which will now be described. The slots 250 and 252 are of sufficient length so that the stop pin is turned through an angle of approximately 90° during each complete cycle of movement of the pin from right to left and back again.

Assuming that the reel to be fully rewound, upon initial movement of the same in an unwinding direction which is effected by exerting a pull on the hose wound on the reel and which is always in opposition to the force exerted by the power means in a rewinding direction, the worm 178 engaging stationary hub gear 144 will first move to the left, as seen in Fig. 4, because of the restraint imposed upon it by bushing 188 and will move the entire shaft assembly including ratchet shaft 180 to the left until the pin 194 on the worm shaft engages the ends of the slots 200 in clutch nut 198, whereupon the worm will rotate freely on the worm shaft 184 for as long as the reel is rotated in an unwinding direction. During this movement to the left, the stop pin 248 working in slots 250 and 252 in the inner and outer sleeves of the cams exerts a force on the sleeve of the outer cam tending to rotate it in a clockwise direction as viewed from the right in Figs. 6 and 7 while at the same time a force is exerted on the sleeve of the inner cam tending to turn it in a counterclockwise direction, against which movement it is locked by pawl 238. As a result, the pin 248 will follow the cam slots 250 in the locked inner cam sleeve 222 and will rotate the ratchet shaft 180, and outer cam 224 through an angle of 45° in a clockwise direction, as viewed in Fig. 8, or from the right in Figs. 6 and 7, so that the pin is moved 45° from the horizontal position, shown in these figures.

Since the piston 106 in cylinder 102 is moved downwardly during unwinding movement of the reel, it is always effective to exert a rewinding force on the reel and will actuate the reel in a rewinding direction at the instant the withdrawing or withholding force on the hose is relieved. Upon initial movement of the reel in rewinding direction, the worm 178 engaging with the stationary hub gear 144 will, because it is restrained against rotation, first move toward the right, as seen in Figs. 4, 6 and 7, moving the entire shaft assembly including ratchet shaft 180 to the right. During this movement to the right the stop pin 248, working in the slots 250 and 252, in the inner and outer cam sleeves, exerts a force on the outer cam 224 in a counterclockwise direction, and in a clockwise direction on the inner cam 222. Since the outer cam 224 is locked by the pawl 238 against rotation in the direction in which the stop pin exerts a force on it, the pin will follow cam slots 252 therein and the ratchet shaft 180, pin 248, and the inner cam 222, will be rotated through and angle of 45° in a clockwise direction, as seen from the right in Figs. 6 and 7, so that pin 248 is in a vertical or approximately vertical position as it approaches the inner ends of the cam slots, as seen in Figs. 6, 7 and 9.

In this position it engages in an opening 254 extending through the end of a locking sleeve 256 and movement of the pin, shaft assembly, and worm to the right continues until the tapered end of the worm engages the inclined friction surface 204 on the clutch nut 198. This will occur after the reel has rotated between 10° and 15° in a rewinding direction, and the reel will then be locked against further rewinding movement because the ratio of the gears previously described, through which the reel shaft is driven from the power means, is such that the power applied to the shaft is not sufficient to turn the same against the frictional restraining force exerted between the worm and the clutch nut.

To condition the restraining mechanism for rewinding of the hose after the reel has been locked against rewinding, a withdrawing pull is exerted on the hose sufficient to cause the reel to rotate between 10° and 15° in an unwinding direction. During this movement the worm, shaft assembly, and stop pin 248 are moved to the extreme left-hand position previously described and the pin is rotated in a clockwise direction, as seen from the right in Figs. 6 and 7, approximately 45° from the vertical by the cam means, as previously described. Upon release of the hose, the power means will rotate the reel in a rewinding direction and the worm, shaft assembly, and stop pin 248 will be moved to the right in the manner previously described. During this movement the stop pin 248 is further rotated approximately 45° in a clockwise direction so that it is in a horizontal or approximately horizontal position when it approaches the inner end of the locking sleeve 256 as shown in Fig. 10.

In this position it engages against shoulders or abutments 258 in the locking sleeve so that movement of the shaft assembly and worm to the extreme right is prevented and the worm is held from engagement with the clutch nut. At this position of the worm the only restraint on its free rotation is that afforded by the spring pressed bushing 188, and since the power means applies sufficient force to overcome this restraint, the reel will continue to rotate in a rewinding direction until the hose is completely rewound or rewinding is otherwise interrupted. The locking sleeve 256, which is housed within the ratchet housing 214, engages at its inner end against the washer 234 which holds the cams in place in the ratchet housing and is locked in position by a locking plate 260 having projections 262 which engage in aligned slots in the ratchet housing and locking sleeve. A cap 264 threaded on the outer end of the formation 172 holds the entire assembly in the bore of the ratchet housing.

Thus it will be seen from the foregoing description of the operation of the ratcheting cam mechanism that the reel restraining mechanism is always conditioned upon initial movement of the reel in an unwinding direction to permit movement in that direction unimpeded. It will also be apparent that the stop pin 248 is automatically moved through an angle of 90° upon each complete cycle of movement of the shaft assembly and worm in a left and right direction, and that this cycle of movement is completed upon actuation of the reel in a rewinding direction following each interruption or discontinuance in the unwinding movement of the reel. Furthermore the stop pin is alternately at vertical position and horizontal position when it approaches the inner end of the locking sleeve 256. As a result the reel is restrained against rewinding movement on alternate successive interruptions in the unwinding movement of the reel, and by properly manipulating the hose the user of the reel may restrain the same from rewinding at any time he desires.

For example, if it is desired to stop rewinding before the hose has been completely rewound, this may be done by withdrawing the hose sufficiently to rotate the reel approximately 15° in an unwinding direction and then releasing the hose. This conditions the ratcheting cam mechanism for allowing the worm to move to restraining position. If, thereafter, it is desired to unwind more hose and lock this new length against rewinding, or if after an initial length of hose has been withdrawn and locked against rewinding and a new length is to be locked against rewinding, it will be necessary after unwinding the desired length first to release the hose, thus conditioning the restraining mechanism for uninterrupted rewinding movement of the reel. If then, after the reel has rewound for approximately 15°, the hose is again withdrawn sufficiently to move the reel approximately 15° in an unwinding direction, and the hose then released, the restraining means will again be conditioned for locking the reel against rewinding.

One of the advantages inherent in the present construction arises from the fact that all the shock of stopping rotation of the reel is taken by the clutch nut 198 and the much more delicate ratcheting mechanism operates merely as a timer so that there is little likelihood of this mechanism being damaged.

It will be apparent that as the spool is rotated in an unreeling direction, the piston 106 in cylinder 102 will be operating against the pressure of the air in the air chamber formed in casting 26 and tubular housing 112 so that excessive pressures might be developed if there is a pressure regulator in the line 136 leading from the source of air under pressure. To avoid creation of this condition, a safety vent 266, shown in Fig. 1, and of conventional construction, may be provided for the casting.

In Figure 11 I have shown a hose reel apparatus generally similar to that shown in Figs. 1 and 2 and driven by power means similar to that previously described, but without means for controlling rewinding movement of the reel. The parts of this reel of duplicate construction to parts of the reel first described, have been given the same numbers in the description which follows:

This reeling apparatus includes a base having a foot 20 and an upright standard 22 with a hollow casting 26 secured thereto by means of cap screws 24. One end of a reel shaft 34 has an axially extending passageway 48 and this end is rotatably supported in a bushing 38 secured in a bore 32 in an internal boss 30 in the casting. The passageway 48 in this shaft communicates at one end with a lubricant inlet chamber 64, and at the other end with a hose 40. Communication between the passageway 48 and hose 40 is established through radial bores 52 and 54, respectively, in the shaft, and in a hub 44 for the reel and an outlet fitting 56 connected at one end to the hose and secured at its opposite end in the bore 54 by means described in connection with the first modification of the invention.

The reel 36 is similar to that described for the previous embodiment of the invention but the hub 44 for this reel may be nonrotatably secured upon reel shaft 34 by means of a stud 268 threaded into the hub and extending into a bore 270 in the reel shaft 34 aligned with bore 52 so that these two bores can be made in a single drilling operation.

Since the reel does not have a ratcheting mechanism, the hub gear 144 of the previous embodiment is not necessary, and its function of supporting a shaft bearing 152 is assumed by a tubular collar 272 staked to an opening in the standard 22. The bearing 152 is of the same type as the corresponding bearing of the reel previously described and is secured in position in the same manner. A sealing ring 274 is secured on shaft 34 between hub 44 and bearing 152 for maintaining lubricant in the hollow collar.

The power means for actuating the reel is similar to that described for the first embodiment of the invention and includes a fluid actuated power cylinder having a piston and a piston rod formed as a rack gear 110 for engaging a pinion 92 on a shaft 94 and thus driving the gear 90 which drives a pinion 88 fixed on the reel shaft 34 to rotate this shaft in a rewinding direction. The cylinder communicates with the interior of casting 26 which receives motivating fluid either through a separate inlet 138 in the casting or through the inlet chamber 64, in the manner which will be hereinafter described.

In using this apparatus, hose is withdrawn from the reel 36 and must be held in extended position by the operator against the retracting force exerted by the power means, and when the withholding force is released the hose will be rewound automatically.

Figure 12:
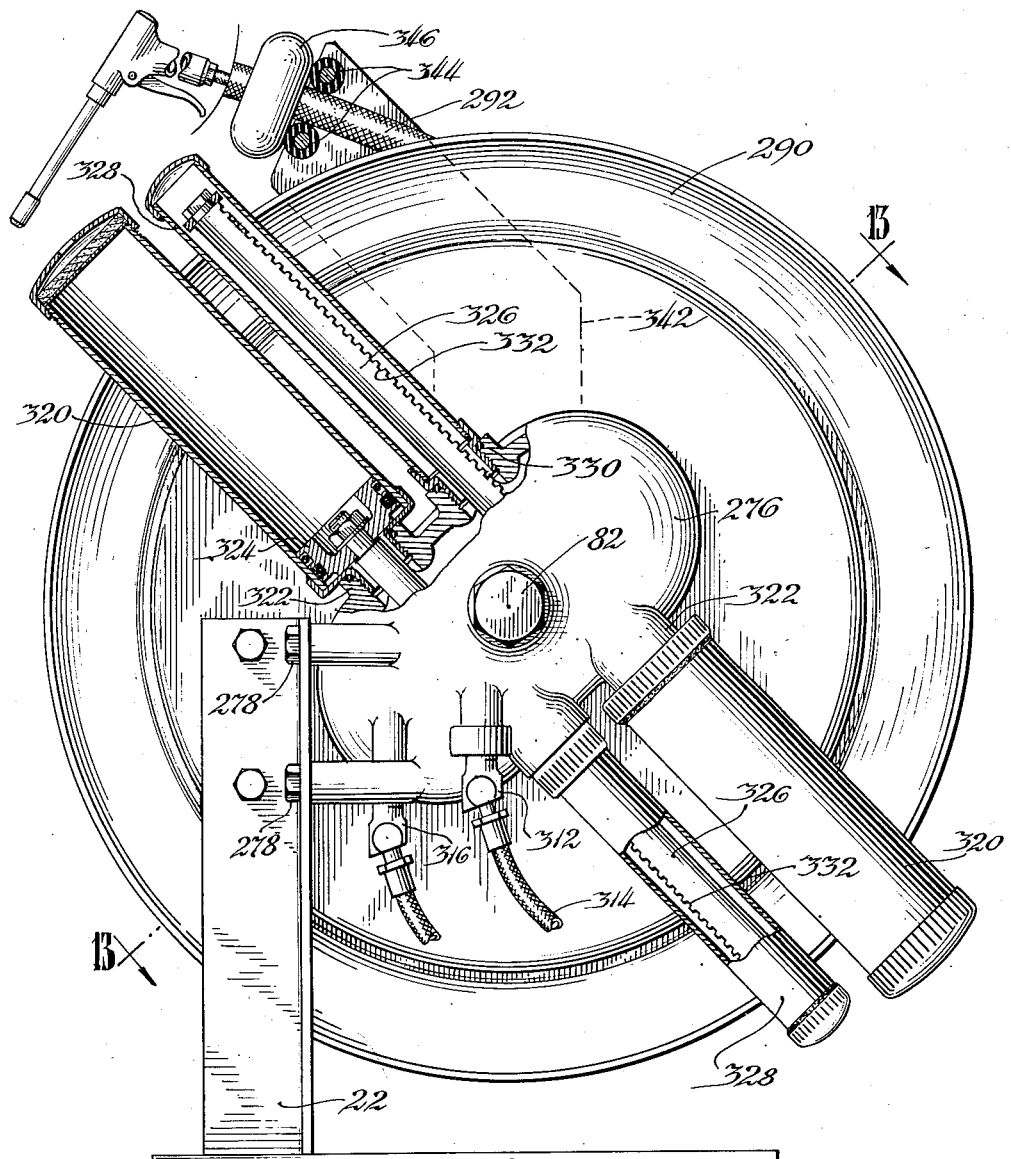
Fig. 12 is a side elevational view partly in section of a further modification of the invention.

A third embodiment of the invention is shown in Figs. 12 and 13 which is particularly adapted for use with relatively stiff hose. As shown in Fig. 12, this reel is supported upon a base including a foot 20 and an upright standard 22 to which a hollow semi-oval shaped casting 276 is secured by means of cap screws 278. A gasket 280 is interposed between the casting and the upright, and the casting is provided with a central internal boss 282 having a bore 284 for supporting one end of a reel shaft 286, there being a bushing 288 in the bore to form a bearing for the shaft 286.

At its opposite end the shaft 286 carries a reel or spool 290, the reel and shaft being nonrotatably secured in the manner described for either one of the two previously described embodiments of the invention. A hose 292 adapted to be wound on the reel 290 communicates with an axial passageway 294 in the reel shaft 286 at one end of the shaft while the opposite end of the shaft communicates with an inlet chamber 296 for lubricant formed by a bore in the casting 276. A means for preventing leakage between the interior of the casting 276 and the inlet chamber 296 is provided by forming rings 72 and 76 and packing rings 74 which are urged together by a spring 80 engaged against a projecting part on the outer forming ring 76. The spring 80 is held under tension by a closure cap 82 for the inlet chamber 296 so that the sealing means may be readily removed, as described for the first embodiment of the invention, to establish communication between the inlet chamber 296 and the interior of the casting through an intermediate recess 308 and a drilled passageway 310. The inlet chamber 296 communicates with an inlet opening in an external boss 312 on the casting, in which the fluid inlet conduit 314 is secured. An inlet for motivating fluid is also provided in an external boss 316 on the casting to which the inlet conduit is secured as shown.

The reel shaft 286 is supported by a bearing 318 in the manner described for the first two embodiments of the invention, and it is driven by power means including oppositely disposed power cylinders 320. These cylinders are of similar construction and are threaded into bosses 322 on the casting 276. In each cylinder is a piston 324 from which projects a piston rod 326 and these piston rods extend in opposite directions through and outwardly of the casting 276. The piston rods 326 project into tubular housings 328 secured in bosses 330 on the casting in axial alignment with the cylinders 320, and movement of the piston rods in an outward direction is limited by stops secured on their outer ends as indicated.

These piston rods are driven in opposite directions by their respective pistons and have rack teeth 332 on opposite edges so that the rods in effect form rack gears. The teeth on these racks engage duplicate pinions 334 secured on shafts 336 which are of similar construction and are supported at opposite ends as described for the shaft 94 of the first embodiment of the invention. The pinions 334 engage with and drive two gears 338 which are of duplicate construction, and these gears engage a pinion 340 fixed on the reel shaft 286 so that the latter is driven in a direction to rewind hose on the reel when the pistons 324 move toward the outer ends of cylinders 320 under the influence of the air or other fluid under pressure in the casting 276. Thus it will be seen that double the power applied to the reel shaft by the power means of the first embodiments of the invention can be secured with the present embodiment so that it is better suited for use in reeling stiff hose or the like, yet the apparatus is very compact in construction.

This form of reel is preferably provided with means for controlling rewinding of the hose so that the reel can be locked against rewinding at any time the desired length of hose has been unreeled. This means may be similar to the restraining mechanism previously described, or other mechanism may be used. For example, the latching means disclosed in Patent 2,563,714 to Everett M. Foster, granted August 7, 1951, and entitled "Hose Reels," may be used with equal facility.

When the hose reels above described are used for storing lubricant hose, the power means is preferably actuated by air under pressure, and since such reels will commonly be used in automobile service stations, air under pressure will normally be available. However, under some circumstances it may be preferable to actuate the power means by the same fluid as that being dispensed in the hose, as, for example, when a reel of this type is used for storing air hose or water hose. In such a case, by removing the forming rings 72 and 76, and packing rings 74, the need for connecting both inlets in the casting with the source of fluid under pressure is eliminated because the interior of the casting 26 and the inlet chamber 64 for the axial passageway in the reel shaft are then brought into communication through recess 70 and the drilled passageway 86 in the first embodiment of the invention, and through recess 308 and drilled passageway 310 in the last embodiment of the invention. Under these conditions one of the inlets may be disconnected from the source of air or other fluid under pressure, and plugged, and the hose reel will operate entirely satisfactorily.

Reeling apparatus of the type herein described is usually mounted within a cabinet, and where that is the case means for guiding the hose as it is being unwound or rewound is secured to the opening in the cabinet wall through which the hose passes. However, if the apparatus is not to be housed in a cabinet, such guide means may be secured to a pair of arms 342, shown in Figs. 1 and 12, which may be suitably secured to the base or to the casting to extend diagonally upwardly therefrom on opposite sides of the reel. A pair of rollers 344 is pivotally secured at the outer ends of these arms, and the hose passes between and is guided by these rollers. Since the power means exerts a constant force in the rewinding direction on the hose, a collar 346 is preferably secured adjacent the outer end of the hose and this collar engages the rollers 344 to limit rewinding of the hose. When the apparatus is mounted within a cabinet, guide rollers similar to rollers 344 may be secured in the opening in the cabinet wall through which the hose passes for guiding the hose.

While I have described my invention as applied to reeling apparatus for hose, it should be apparent that the novel features of construction herein disclosed are applicable to other types of reeling apparatus and that the reel restraining means described may be used on other types of hose reels actuated by other power means. Likewise the particular power means which I have described need not be used in conjunction with the particular restraining means but is equally adaptable for use with reeling apparatus having other restraining means. Numerous other variations and modifications of the embodiments described may be made without departing from the underlying principles of the invention. I therefore desire, by the following claims, to include within the scope of the invention all such variations and modifications by which substantially the results of my invention may be obtained through the use of substantially the same or equivalent means.

I claim:

1. Reeling apparatus of the type including a rotatable reel supporting a hose or the like including, in combination, power means for rotating said reel in a rewinding direction, fixed gearing, means for restraining rotation of said reel including a worm carried by said reel in engagement with said gearing, means restraining rotation of said worm for effecting axial movement thereof in opposite directions upon opposite rotary movement of the reel for moving the worm to positions rendering the same effective or ineffective to restrain rotation of the reel, and control means operated upon movement of said worm toward and from one position intermittently to limit movement of the worm toward the other position.

2. Reeling apparatus of the type including a rotatable reel supporting a hose or the like, including in combination, power means for rotating said reel in a rewinding direction, fixed gearing, restraining means for said reel including a worm carried by said reel in engagement with said gearing, means restraining rotation of said worm for effecting axial movement thereof in opposite directions upon opposite rotary movement of the reel for moving the worm to a position rendering the same effective or ineffective to restrain rotation of the reel, and control means operated upon movement of said worm toward and from noneffective position for limiting axial movement of said worm toward reel restraining position to render the same ineffective to restrain the reel upon actuation of the reel in a rewinding direction intermittently upon successive interruptions in unwinding movement of the reel.

3. In a reeling apparatus of the type having a rotatable reel and power means for rotating the reel in a rewinding direction, in combination, means for controlling rotation of the reel including a worm carried by said reel for rotational and axial movement upon its own axis and for angular movement with the reel, a fixed gear for imparting a driving force to said worm while said reel is rotating, means to cause said worm initially to move axially upon change in the direction of rotation of said reel and after predetermined axial movement to rotate, fixed means adapted to be engaged by said worm upon axial movement thereof to one position for restraining rotation of said reel in a rewinding direction, and cam means for controlling movement of the worm toward reel restraining position.

4. In a reeling apparatus of the type having a rotatable reel and power means for rotating the reel in a rewinding direction, the combination comprising a worm carried by said reel for rotation therewith, a nonrotatable axially movable shaft assembly for supporting said worm for rotation thereupon and for axial movement therewith, a fixed gear for imparting movement to said worm, when said reel is rotated, fixed means adapted to be engaged by said worm for locking the same thereby to lock said reel against rewinding movement, a stop member rotatable to and from a position for holding said worm from engagement with said fixed means, cam means for controlling rotation of said stop member including rotatable inner and outer sleeve members having helical slots formed therein, said stop member extending into said slots to interconnect said sleeve members and being movable longitudinally therein upon axial movement of said shaft assembly, said slots being oppositely directed in the two sleeve members whereby said sleeve members are urged in opposite directions upon axial movement of the stop member, means constraining said sleeve members for rotation in the same direction whereby one of said sleeve members is held fixed upon axial movement of the stop in one direction to guide rotary movement of the stop member and other sleeve member, and the said other sleeve member is held fixed upon axial movement of the stop member in the opposite direction to guide rotary movement of the stop member and said one of said sleeve members first mentioned for selectively moving said stop member to said predetermined holding position.

5. In a reeling apparatus of the type having a reel rotatable by power means in a rewinding direction, the combination comprising a supporting structure including a hollow casing, a reel shaft rotatably supported adjacent one end in said casing, a hollow gear fixed to said supporting structure, nonfriction thrust bearing means secured in said gear for supporting said shaft adjacent its opposite end, and control means actuated by said gear upon rotation of said reel for selectively restraining said reel against rotation in a rewinding direction.

6. Reeling apparatus of the type including a rotatable reel, means for rotating the reel in a rewinding direction, a pair of adjacent parts, one of the parts rotating with the reel and the other being fixedly supported to prevent its rotating with the reel, a worm secured to one of the parts for rotational movement and for axial movement between predetermined positions, a gear mounted on the other of said parts to apply oppositely directed driving forces to the worm upon rotation of said reel in opposite directions, means to restrain rotational movement of said worm only sufficiently to cause the latter to shift from one axial position to the other upon change in the direction of rotation of said reel, means to arrest rotation of said worm at the axial position to which it moves in response to rotation of the reel in a rewinding direction thereby to arrest rotation of said reel, and means to arrest axial movement of said worm short of reel arresting position upon alternate movements of the reel in a rewinding direction.

7. Reeling apparatus as defined in claim 6 wherein the gear is stationary and is carried by the fixed part of the apparatus and the worm is supported for rotation upon its own axis by the part rotating with said reel for angular movement with the reel, said rotating part being a portion of the reel, and wherein the gear and worm are in driving engagement so that oppositely directed driving forces are applied by the gear to the worm when the reel is rotated in opposite directions.

8. Reeling apparatus of the type including a rotatable reel, means for rotating the reel in a rewinding direction, a pair of adjacent parts, one of the parts rotating with the reel and the other being fixedly supported to prevent its rotating with the reel, a worm secured to one of the parts for rotational movement and for axial movement between predetermined positions, a gear mounted on the other of the parts to apply oppositely directed driving forces to the worm upon rotation of said reel in opposite directions, means to restrain rotational movement of said worm only sufficiently to cause the latter to shift from one axial position to the other upon change in the direction of rotation of said reel, resilient means for biasing said restraining means to restraining position, said means automatically compensating for wear between the restraining means and worm, means to arrest rotation of said worm at the axial position to which it moves in response to rotation of the reel in a rewinding direction thereby to arrest rotation of said reel, and means to arrest axial movement of said worm short of reel arresting position upon alternate movements of the reel in a rewinding direction.

9. In a reeling apparatus of the type which has a rotatable reel for hose or the like the combination comprising, power means for rotating the reel in a rewinding direction, said means applying a constant rewinding force to the reel, a pair of adjacent parts, one of the parts rotating with the reel and the other being fixedly supported to prevent its rotating with the reel, a worm rotatably supported by one of the parts under sufficient restraint to cause the worm to move axially when a driving force is applied to the worm but not under sufficient restraint to prevent rotation thereof when it is locked against axial movement, a gear secured to the other of the parts to apply oppositely directed driving forces to said worm when said reel is rotated in opposite directions, means to lock said worm against rotation upon axial movement thereof to a predetermined position in response to rotation of the reel in a rewinding direction thereby to lock said reel against rotation in the said direction, and means periodically actuated in response to a predetermined sequence of changes in the direction of rotation of said reel to arrest movement of said worm toward reel locking position whereby locking of the reel against rewinding may be effected by manipulation of the hose.

10. Reeling apparatus of the type including a rotatable reel, means for rotating the reel in a rewinding direction, a pair of adjacent parts, one of the parts being secured to the reel and the other being fixedly supported to prevent its rotating with the reel, a worm secured to one of the parts for rotational movement and for axial movement between predetermined positions, a gear mounted on the other of the parts to apply oppositely directed driving forces to the worm upon rotation of said reel in opposite directions, means frictionally to restrain rotational movement of said worm only sufficiently to cause the latter to shift from one axial position to the other upon change in the direction of rotation of said reel, means frictionally to restrain rotation of said worm at the axial position to which it moves in response to rotation of the reel in a rewinding direction thereby to arrest rotation of said reel, and control means operated in response to axial movement of the worm in opposite directions caused by unwinding and rewinding movements of the reel to arrest axial movement of said worm short of reel arresting position after predetermined rewinding movement of the reel upon alternate reversals in the direction of reel movement from unwinding to rewinding.

11. Reeling apparatus of the type including a rotatable reel, means for rotating the reel in a rewinding direction, a pair of adjacent parts, one of the parts being fixed to the reel and the other being fixedly supported to prevent its rotating with the reel, a rotatable and axially movable worm mounted on one of the parts, a gear mounted on the other of the parts to cause driving forces to be applied to the worm upon rotation of the reel, means to cause the worm to move axially between predetermined positions upon change in the direction of rotation of the reel, means to arrest rotational movement of said worm at one of its predetermined axial positions effective through said gear to arrest rotation of the reel, and means to control movement of said worm to reel arresting position including a stop member movable to a position to arrest movement of the worm short of reel arresting position, and cam means actuated upon change in the direction of rotation of the reel to effect movement of said stop member to said position upon alternate reversals in the direction of rotation of the reel from unwinding to rewinding movement.

12. Reeling apparatus of the type including a rotatable reel, means for rotating the reel in a rewinding direction, a pair of adjacent parts respectively secured to the reel and fixedly supported, a worm secured to one of the parts for rotational movement and for axial movement between predetermined positions, a gear mounted on the other of the parts to apply oppositely directed driving forces to the worm upon rotation of said reel in opposite directions, means to cause the worm to shift from one axial position to the other upon change in the direction of rotation of said reel, means to arrest rotation of said worm at the axial position to which it moves in response to rotation of the reel in a rewinding direction thereby to arrest rotation of said reel, a pair of relatively movable stop members mounted so that one may pass the other when the stop members are in one relative position while at another relative position they are prevented from doing so, one of said stop members being connected to said worm to arrest movement of the worm to reel arresting position when the stop members are in the latter relative position, and cam means to cause said stop members to move relatively from one position to the other each time the reel moves at least a predetermined distance in an unwinding and a rewinding direction.

13. In a reeling apparatus of the type which has a rotatable reel the combination comprising, means for rotating the reel in a rewinding direction, a pair of adjacent parts respectively secured to the reel and fixedly supported, a worm rotatably supported on one of the parts, means to cause the worm to move axially upon initial application of a driving force thereto, a gear supported on the other of the parts to apply oppositely directed driving forces to said worm when said reel is rotated in opposite directions, means to lock said worm against rotation upon axial movement thereof to a predetermined position in response to rotation of the reel in an unwinding direction thereby to lock said reel against rotation in said direction, a rotatable stop member operatively connected for axial movement with said worm, an abutment adapted to be engaged by said stop member when it is in one angular position to arrest movement of said shaft assembly and worm toward said predetermined position and to clear said abutment when it is at another angular position to render the stop member ineffective to arrest axial movement of the worm, cam means to rotate said stop member from one position to the other each time said worm completes a cycle of axial movement toward and from said predetermined position in response to a change in the direction of rotation of said reel.

14. Reeling apparatus of the type including a rotatable reel, means for rotating the reel in a rewinding direction, a pair of adjacent parts respectively rotating with the reel and fixedly supported to prevent rotation with the reel, a worm secured to one of the parts for rotational movement and for axial movement, a gear secured to the other of the parts to apply oppositely directed driving forces to the worm upon rotation of said reel in opposite directions, means to cause an axial thrust to be applied to said worm when the reel rotates sufficient to shift the worm axially, means spaced axially of the worm to arrest axial and rotational movement of said worm when it moves in response to rotation of the reel in a rewinding direction thereby to arrest rotation of said reel, means for controlling movement of said worm to reel arresting position including a fixed abutment, a stop member connected for axial movement with said worm and having a follower affixed thereto, said stop member being rotatable between a position at which said follower engages said abutment and thereby arrests movement of the worm toward reel locking position and a position at which it clears said abutment, and means to rotate said stop member from one position to the other including cam means having oppositely arranged helical camways formed therein to receive said follower and effect continuous rotary movement of the stop member from one position to the other during each complete cycle of axial movement imparted to the stop member by the worm.

15. Reeling apparatus of the type including a rotatable reel, means for rotating the reel in a rewinding direction, means for arresting rotation of the reel in a rewinding direction including interengaging gearing operatively connected to said reel to cause driving forces to be applied therebetween effective to impart relative movement to the gearing upon rotation of the reel, means movable to engage with the gearing to arrest relative movement of the gearing and thereby arrest rotation of said reel, means rendered effective to cause movement of said gearing and arresting means relatively to bring the same into and out of reel arresting engagement upon rotation of the reel in opposite directions, and means to control relative movement between the gearing and arresting means including means to arrest relative movement of the gearing and arresting means toward reel arresting position rendered effective upon alternate changes in the direction of movement of the reel and gearing from an unwinding to a rewinding direction.

16. Reeling apparatus of the type including a rotatable reel, means for rotating the reel in a rewinding direction, means for arresting rotation of the reel in a rewinding direction including interengaging gearing operatively connected to said reel to cause driving forces to be applied therebetween for imparting relative movement to the gearing upon rotation of the reel, means movable into engagement with the gearing to arrest relative movement of the gearing and thereby arrest rotation of said reel, means rendered effective to cause movement of said gearing and arresting means relatively to bring the same into and out of reel arresting engagement upon rotation of the reel in opposite directions, stop means movable into and out of a predetermined position at which said stop means is rendered effective to arrest relative movement between the gearing and arresting means, and cam means to cause said stop means to move to said predetermined position upon alternate changes in the direction of movement of the reel and gearing from an unwinding to a rewinding direction.

17. In a reeling apparatus of the type which has a rotatable reel the combination comprising, means for rotating the reel in a rewinding direction, a pair of adjacent parts, one of the parts rotating with the reel and the other being fixedly supported to prevent its rotating with the reel, a worm rotatably supported on one of the parts, a gear fixed to the other part for applying oppositely directed driving forces to said worm upon rotation of said reel in opposite directions, means to cause said worm initially to move axially upon change in the direction of rotation of the reel, separate stop means to limit axial movement of said worm between extreme positions in either direction which it is moved in response to unwinding and rewinding movements of the reel to maintain said worm and gear in driving engagement at all times, said stop means including means rendered effective after predetermined rewinding movement of the reel upon alternate successive sequences of movement of the reel in an unwinding and a rewinding direction to release said worm for axial movement beyond one of said extreme positions at which axial movement thereof is limited by said stop means, and means for arresting axial and rotational movement of said worm upon movement thereof beyond said one of said extreme positions thereby to lock said reel against rewinding movement.

18. In a reeling apparatus of the type which has a rotatable reel the combination comprising, means for rotating the reel in a rewinding direction, a pair of adjacent parts respectively rotating with the reel and fixedly supported to prevent rotation with the reel, a worm rotatably supported on one of the parts, a gear mounted on the other of the parts for applying oppositely directed driving forces to said worm upon rotation of said reel in opposite directions, means to cause said worm initially to move axially upon change in the direction of rotation of the reel, separate stop means to limit axial movement of said worm between said extreme positions in either direction which it is moved axially in response to unwinding and rewinding movements of the reel to maintain said worm and gear in driving engagement at all times, said stop means including a pair of relatively movable stop members to control axial movement of the worm in response to unwinding movement of the reel, one of which is connected to said worm, said latter stop member being capable of passing the other when the two are at one relative position to release the worm for movement beyond the extreme position to which it moves in response to unwinding movement of the reel, means to move said stop members relatively to said position upon alternate rewinding movements of the reel which have been preceded by unwinding movement, and means for arresting axial and rotational movement of said worm upon axial movement thereof beyond the said extreme position thereby to lock said reel against rewinding movement.

19. In a reeling apparatus of the type which has a rotatable reel the combination comprising, means for rotating the reel in a rewinding direction, a pair of adjacent parts respectively rotating with the reel and fixedly supported to prevent rotation with the reel, an axially movable shaft assembly mounted on one of the parts, a worm rotatably supported on said shaft assembly under sufficient restraint to cause the worm and shaft assembly to move axially when a driving force is applied to the worm but not under sufficient restraint to prevent rotation thereof when the shaft assembly is locked against axial movement, a gear fixed to the other of the parts to apply oppositely directed driving forces to said worm when said reel is rotated in opposite directions, means to lock said worm against rotation upon axial movement thereof to a predetermined position in response to rotation of the reel in a rewinding direction thereby to lock said reel against rotation in the said direction, a stop member to arrest movement of said shaft assembly and worm at an arresting position short of said predetermined position to prevent locking of the reel, and cam means for moving said stop member into and out of arresting position in response to successive sequences of movement of the reel in an unwinding and rewinding direction.

20. In a reeling apparatus of the type which has a rotatable reel the combination comprising, power means for rotating the reel in a rewinding direction, a pair of adjacent parts respectively rotating with the reel and fixedly supported to prevent rotation with the reel, an axially movable shaft assembly mounted on one of the parts, a worm rotatably supported on said shaft assembly, a gear mounted on the other of the parts for applying oppositely directed driving forces to said worm upon rotation of said reel in opposite directions, a bushing on said shaft assembly abutting against one end of said worm to lock said worm against axial movement relative to the shaft and frictionally to restrain rotation of said worm sufficiently to cause said worm and shaft assembly to move axially when they are free to do so but not sufficiently to prevent rotation of the worm when the shaft assembly is locked against axial movement, resilient means biasing said bushing into engagement with the worm automatically to take up for wear between the bushing and worm, means to lock said worm against rotation upon axial movement thereof to a predetermined position in response to rotation of the reel in a rewinding direction thereby to lock said reel against rotation in the said direction, and means periodically actuated in response to a predetermined sequence of changes in the direction of rotation of said reel to arrest movement of the worm short of the predetermined reel locking position.

21. In a hose reeling apparatus including a reel supporting a hose for dispensing a fluid and fluid pressure operated means for rotating the reel in a direction to rewind hose thereon, the combination of supporting structure including a hollow casing having separate chambers formed therein for receiving, respectively, motivating fluid and a fluid to be dispensed, separate inlet connections for said chambers, means to establish communication between the inlet chamber for fluid to be dispensed and the hose, means for establishing communication between the motivating fluid chamber and the fluid pressure-operated means, a by-pass passageway between said two chambers, and a seal for said by-pass passageway adapted to be removed to establish communication between said two chambers so that said pressure actuated means may be actuated by the fluid which is to be dispensed when the seal is removed and by a separate fluid when the seal is in place.

22. In a hose reeling apparatus including a reel supporting a hose for dispensing a fluid and fluid pressure operated means for rotating the reel in a direction to rewind hose thereon, the combination of supporting structure including a hollow casing having separate chambers formed therein for receiving, respectively, motivating fluid and a fluid to be dispensed, said latter chamber having an access aperture, a removable closure for said aperture, separate inlet connections for said chambers, means to establish communication between the inlet chamber for fluid to be dispensed and said hose, means for establishing communication between the inlet chamber for motivating fluid and the fluid pressure-operated means, a by-pass passageway between said two chambers, and a seal for said by-pass passageway adapted to be removed to establish communication between the two chambers so that the pressure operated means may be actuated by the fluid which is to be dispensed when the seal is removed and by a separate fluid when the seal is in place, said by-pass passageway being aligned with said access aperture to facilitate insertion and removal of the seal when the apparatus is in assembled condition.

23. Hose reeling apparatus including a rotatable reel supporting a hose for dispensing a fluid and fluid pressure operated means for rotating the reel in a direction to rewind hose thereon, the combination of supporting structure including a hollow casing having a wall to form separate chambers therein for receiving, respectively, motivating fluid and a fluid to be dispensed, separate inlet connections for said chambers, a hollow shaft for said reel, means to support said hollow shaft in said casing with one end part thereof extending through the wall for communication with the inlet chamber for fluid to be dispensed, means for connecting the hose to the shaft to establish communication between the inlet chamber for fluid to be dispensed and the hose through said shaft, means for establishing communication between the inlet chamber for motivating fluid and the fluid pressure-operated means, and means including an annular conduit in the casing surrounding at least a portion of said end part of the shaft and communicating at opposite ends with the two chambers, and a packing in said conduit to form a fluid tight seal around the shaft between the chambers and thereby prevent intermixture of the fluid to be dispensed and the motivating fluid where these fluids are different, said packing being removable to establish communication between the chambers so that the fluid being dispensed may be used as a motivating fluid.

GEORGE H. PALM.

REFERENCES CITED

The following references are of record in the file of this patent:

UNITED STATES PATENTS

| Number | Name | Date |
|---|---|---|
| 1,151,890 | McConnell | Aug. 31, 1915 |
| 1,948,158 | Barr | Feb. 20, 1934 |
| 2,221,566 | Barks et al. | Nov. 12, 1940 |
| 2,270,283 | Ewald | Jan. 20, 1943 |
| 2,315,085 | Churchward | Mar. 30, 1943 |
| 2,391,840 | Melletti | Dec. 25, 1945 |